March 30, 1937. W. A. GOSS 2,075,342
CLUTCH
Filed Dec. 31, 1934

Inventor:
William A. Goss,
By Kent W. Worrell
atty

Patented Mar. 30, 1937

2,075,342

UNITED STATES PATENT OFFICE 2,075,342

CLUTCH

William A. Goss, Libertyville, Ill., assignor to Johnson Motor Company, Waukegan, Ill., a corporation of Delaware Application December 31, 1934, Serial No. 759,884

1 Claim. (Cl. 192—42)

This invention relates in general to a mechanical clutch of the over-running type and is more particularly described in connection with a starting mechanism for a small gas engine although it may be more generally used wherever applicable.

An important object of the invention is in the provision of a clutch member adapted to be engaged by a movable segment which is free to rotate in one direction but makes a resilient grip engagement when rotated in the opposite direction.

A further object of the invention is in the provision of an over-running clutch mechanism in which a spiral spring is used as a connecting element between the relatively movable clutch members.

In the accompanying drawing showing a preferred embodiment of the invention,

Figure 1:
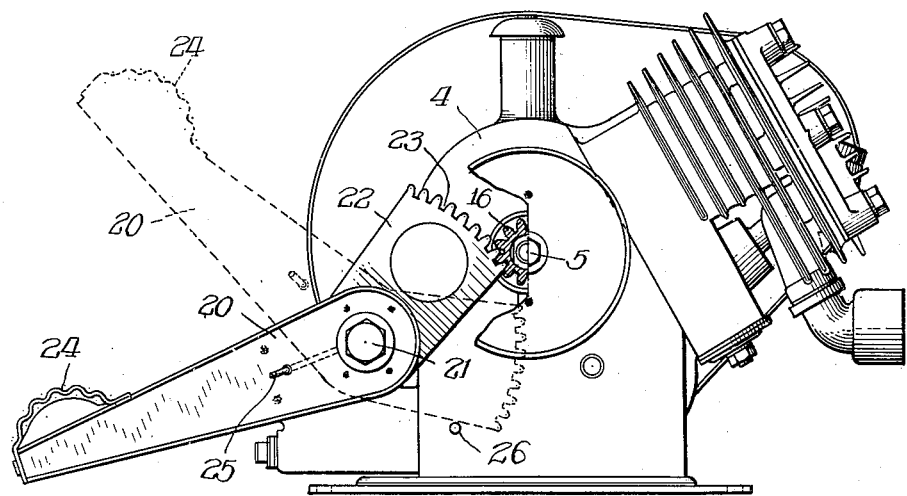
Fig. 1 is an end elevation of a gas engine with parts broken away for clearness, illustrating this invention.

A clutch mechanism for a gas engine starter, and other similar uses, must be both simple in construction and operation, not likely to become damaged or to get out of order, effective and efficient in operation, and also relatively inexpensive. The present invention fulfills these requirements by providing a clutch member which is relatively rotatable upon the part which it is to engage and has only one resilient member in the form of a spiral spring to make connection between the parts. It is also freely rotatable without engagement in one direction so that a starter lever or pedal may be returned to its initial or starting position.

Referring now more particularly to the drawing, this invention is particularly described in connection with a small internal combustion engine 4 having a power shaft 5 and a driving pulley 6 non-rotatably secured at the end thereof in any suitable manner as by a fastening nut 7. This driving pulley preferably consists of two similar stampings 8 secured together to provide a belt groove 9 by means of a fastening bolt 10. The pulley 6 abuts a shoulder 11 near the end of the fastening against which it is held by the fastening nut 7 and a shoulder 12 is provided at a distance from the end of the nut forming a reduced portion 13 upon which a clutch member 14 is freely rotatable.

This clutch member 14 has an outer surface 15 of uniform diameter adjacent the pulley 6 and at the end remote from the pulley it is formed with a gear 16.

To provide a clutch connection between the member 14 and the pulley, a spiral spring 17 which has a normal inner diameter slightly less than that of the outer surface 15 of the member 14 is wound thereon so that it has a loose frictional engagement with the clutch member 14 and one end is provided with a hook or an eye 18 engaged by the bolt 10 of the pulley for anchoring this end securely thereto, the other end 19 of the spring being wound upon the outside of the member 14.

In order to actuate the clutch member 14 with respect to the pulley 6 and its shaft 5 a lever or pedal 20 is mounted upon a stud 21 at one side of the shaft 5 and has an arm 22 secured to or formed integral therewith which carries a toothed segment or extremity 23 adapted to engage the teeth of the pinion or gear 16. This lever ordinarily has a handle grip or a foot engaging portion 24 by means of which it may be pressed quickly downward at its outer end, the lever and its arm 22 being returned either manually or by means of a spring 25 to the broken line position as shown in Fig. 1 and preferably maintaining engagement at all times when not in use with the stop pin 26.

Figure 3:
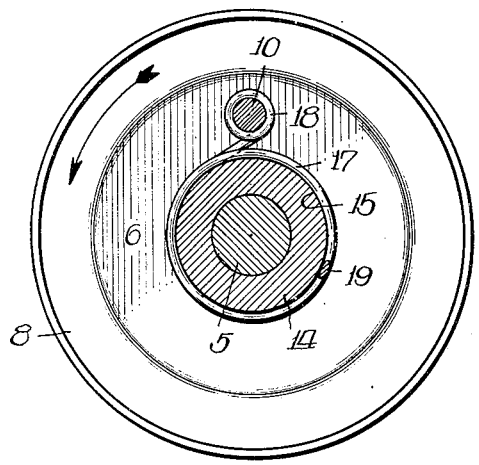
Fig. 3 is a section taken on the line 3—3 of Fig. 2.
Figure 2:
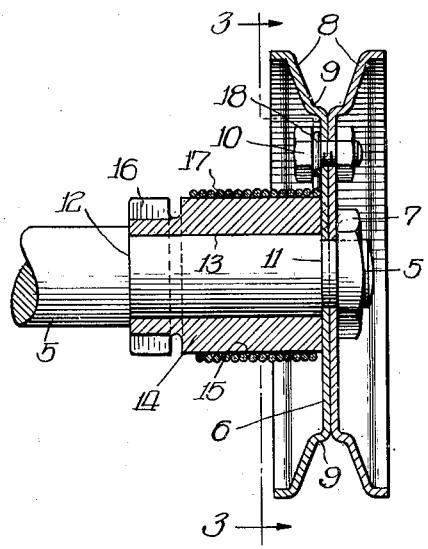
Fig. 2 is a sectional view of the clutch mechanism.

In operation, when the lever 20 is pressed downwardly, the teeth 23 engage the gear 16, turning it in the direction of the arrow shown in Fig. 3, which is in the direction of winding of the clutch spring 17 which has sufficient friction to cause this spring to contact around the hub over the outside of the member 14, thus forcing the pulley 6 to follow this same direction of rotation and thereby rotating the shaft 5 in a direction to start the engine.

As soon as the gear 16 is stopped by the lever 20 or the engine is started in the same direction, the wound spring will be loosened, allowing the shaft 5 to continue its rotation in the same direction and the gear 16 may then be returned by means of the lever 20 in the direction in which it will not engage the spring 17 to its normal at rest position.

After the engine is started, the pinion or gear 16 and its attached clutch member 14 will be rotated relatively opposite the direction of the shaft 5 until the gear segment 23 is disengaged from the pinion 16 in the position of rest as indicated by the broken outline in Fig. 1. By virtue of the friction caused by the rapping action of the spring 17, the gear 16 and its clutch member 14 will pick up speed and rotate with and in the direction of the shaft 5.

This construction therefore offers a very simple and effective clutch which operates quickly by the frictional engagement of the spring with the hub of the gear 16 to connect it with the pulley in one direction of movement and to disconnect them when relatively moved in the other direction.

For this reason this clutch is particularly well adapted for a gas engine starter which requires a short quick movement in one direction and a quick disengagement therefrom as soon as the engine starts or if there is any reverse movement of the parts.

I claim:

The combination with a shaft having spaced shoulders one of which is adjacent its end, of a sleeve rotatable on said shaft adjacent the last mentioned shoulder and in abutment with the other, a pulley having a web mounted at the end of the shaft in abutment with the shoulder adjacent such end and also in abutment with the end of said sleeve, a nut threaded to the end of the shaft and confining said pulley web thereon, whereby to fix said pulley to said shaft and to fix the axial position of said sleeve thereon, and a spring wound loosely about said sleeve and having one end connected with said pulley to comprise a one way clutch connection from said sleeve to said shaft through said pulley, the web of said pulley fitting sufficiently closely to said sleeve to confine said spring thereon.

WILLIAM A. GOSS.